L. S. FITHIAN.
Steam-Plow.
No. 46,048.
Patented Jan. 24, 1865.
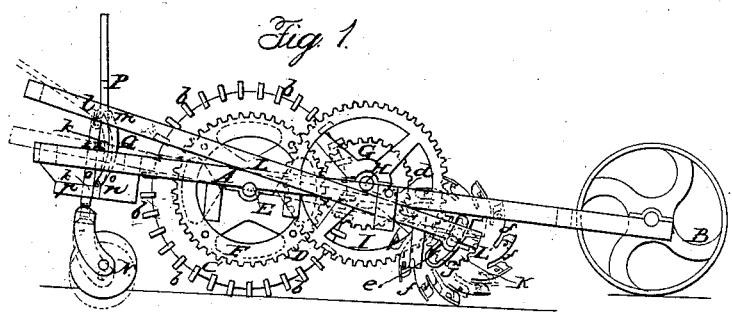
Fig. 1.
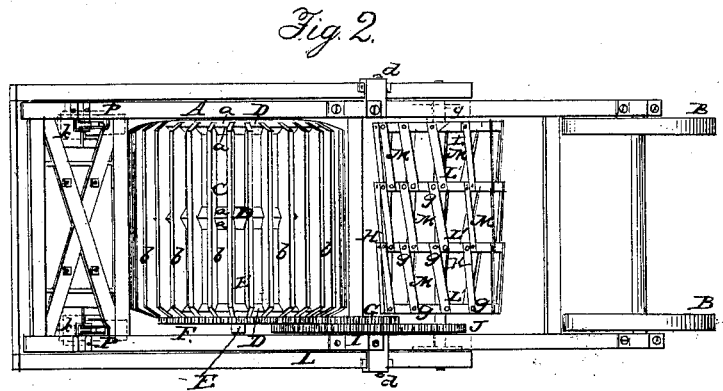
Fig. 2.
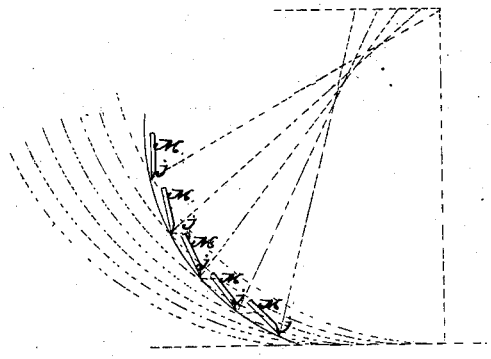
Fig. 3.
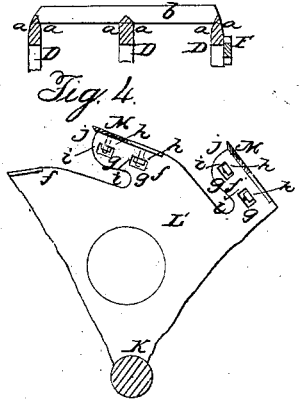
Fig. 5.
Fig. 4.
Witnesses:
Inventor:

UNITED STATES PATENT OFFICE.

LEMUEL S. FITHIAN, OF ABSECOM, NEW JERSEY, ASSIGNOR TO HIMSELF AND JOHN YOUNG, OF JOLIET, ILLINOIS.

MACHINE FOR PULVERIZING THE SOIL.

Specification forming part of Letters Patent No. 46,048, dated January 24, 1865.

*To all whom it may concern:*

Be it known that I, LEMUEL S. FITHIAN, of Absecom, in the county of Atlantic and State of New Jersey, have invented a new and Improved Implement or Device for Pulverizing the Soil; and I do hereby declare that the following is a full, clear, and exact description of the same, reference being had to the accompanying drawings, making a part of this specification, in which—

Figure 1 is a side view of my invention; Fig. 2, a plan or top view of the same; Fig. 3, a diagram showing the position of the cutters at different points in their movement; Fig. 4, an enlarged view of a portion of one end of the rotary cutter or pulverizer; Fig. 5, a longitudinal section of a portion of the traction-drum.

Similar letters of reference indicate corresponding parts in the several figures.

This invention consists in a novel construction and arrangement of a rotary cutter or pulverizer, as hereinafter fully shown and described, whereby the same is made to operate in the most efficient manner and to overcome difficulties hitherto attending the rotary cutters used for pulverizing the soil.

To enable those skilled in the art to fully understand and construct my invention, I will proceed to describe it.

A represents a rectangular frame, the back part of which is supported by a pair of wheels, B B, and the front part supported by a drum, C, constructed by having a series of heads, D, attached to or keyed on a shaft, E, the outer edges of the heads being beveled at each side, as shown at $a$, and slats $b$ attached to them to form the periphery of the drum. The slats $b$ are of rectangular form in their transverse section, and they are placed on the heads D so as to allow spaces between them for the escape of dirt and to admit of the slats penetrating into the earth as the machine is drawn along.

In consequence of the edges of the heads D being beveled at each side, the earth which is pressed between the slats $b$ as the drum C rotates is allowed to escape or is prevented from binding therein, and consequently said drum is always kept in an efficient working condition, for if the spaces between the slats $b$ were allowed to become filled with earth the drum would have a smooth exterior and but little traction, as the slats $b$ would not be able to penetrate the earth.

At one end of the drum C there is attached concentrically a toothed rim, F, which gears into a pinion, G, on a shaft, H, which has a toothed wheel, I, upon it, the latter gearing into a pinion, J, on a shaft, K. This shaft K has its bearings $c$ at the back end of a frame, L, which encompasses the greater portion of the frame A and works upon pivots $d$ at the sides of A. The shaft K passes through curved guides $e\ e$, attached one to each side of the frame A, and on the shaft K there are placed a series of heads, L', of any suitable diameter and having their peripheries slotted in curved form, as shown in Figs. 1 and 4, so as to leave curved projections $f$, to which cutters M are attached by means of bolts $g$, the nuts $h$ of which are in slots $i$ in the projections $f$, as shown clearly in Fig. 4.

By having the nuts $h$ fitted in the slots $i$ they are prevented from catching grass, weeds, trash, &c., and by having the shaft K pass through the curved guides $e\ e$ the cutter or pulverizer is allowed to rise and fall to conform to the inequalities of the ground, the front end of frame L being loaded, if necessary, to equipoise to a necessary extent the cutter or pulverizer.

The cutters M are attached obliquely to the heads L' and are a little nearer the shaft K at one end than at the other end, the cutters extending from one head, L', to the next head, as shown in Fig. 2. By this arrangement the cutter M may be made of a straight piece of metal. By this arrangement the cutter or pulverizer is in the form of a series of frustums of cones, each provided with cutters, as shown clearly in Fig. 2, and in consequence of this form the cutters M operate on the soil with a drawing cut, and they may be operated with a much less expenditure of power than if placed parallel with the shaft K. The cutters M have also a raking position on the heads L', and their cutting-edges are formed by a bevel, $j$, at their inner sides. In consequence of having the bevels $j$ at the inner sides of the cutters, the latter have a tendency, as they rotate, to penetrate into the earth, while the raking position of the cutters prevents them from bearing against the hard side of the earth while performing their cut therein under the forward movement of the machine. (See Fig. 3.)

The shaft K, it will be seen, is rotated from the traction-drum C through the medium of the gearing F G I.

The front part of the frame A, just in front of the traction-drum C, has two caster-wheels, N N, connected with it, one at each side. These caster-wheels are fitted in the lower parts of standards O O, which pass through guides K attached to the frame A.

To the upper end of each standard O a lever, P, is connected by a pivot, $l$, said levers having their fulcra $m$ in bars Q, which are connected at their lower ends to plates $n$ by pivots $o$, the plates $n$ being secured to a cross-bar, $p$, underneath frame A. The pivots $l$ and fulcra $m$ of the levers P have such a relative position with each other that when the levers are brought down to a horizontal position they will be locked in such a state, and the front part of the frame A will be supported by the caster-wheels and the traction-drum C elevated above the surface of the ground, so that the pulverizer will be inoperative, which is necessary in turning the machine at the end of a field or in transporting or drawing it from place to place.

Having thus described my invention, what I claim as new, and desire to secure by Letters Patent, is—

1. Constructing the rotary pulverizer in sections, the cutters M of which coincide with frustums of a cone or cones, substantially as and for the purpose specified.

2. Giving the cutters M a raking position, and also an oblique position on the heads L', substantially as and for the purpose set forth.

LEMUEL S. FITHIAN.

Witnesses:
M. M. LIVINGSTON,
J. F. YOUNG.